Patented May 14, 1940

2,201,062

UNITED STATES PATENT OFFICE 2,201,062

MEDICINAL PREPARATION

Benjamin H. Thurman, Bronxville, N. Y., assignor to Refining, Inc., Reno, Nev., a corporation of Nevada No Drawing. Application June 14, 1938, Serial No. 213,701

10 Claims. (Cl. 99—163)

This invention relates to medicinal preparations, and more particularly to medicinal preparations including or derived from such highly unsaturated oils as codliver oil and other fish or fish liver oils.

An object of the invention is to provide a process of stabilizing medicinal preparations containing refined oils or fats which in their crude state have a disagreeable odor and taste and which revert to such odor and taste shortly after refining and before rancidity due to oxidation.

Another object of the invention is to provide a process of stabilizing codliver oil and similar oils of their vitamin rich extracts or concentrates, which revert to the original unpleasant flavor of the oil after refining and prior to rancidity, by adding thereto a small amount of a stabilizing agent.

A further object of the invention is to provide a new stabilized medicinal product produced from or containing highly unsaturated oils, which product will not revert to the original flavor of the oil prior to rancidity.

A still further object of the invention is to provide a stabilized refined codliver oil or similar oil product containing a small amount of vegetable phosphatidic material which prevents reversion to the original flavor of the oil.

Large quantities of such vitamin rich oils as codliver oil, halibut liver oil and other fish and fish liver oils, their extracts and concentrates, are employed as a source of vitamins, particularly vitamin D. The crude oils before intensive refining have a characteristic fish or paint-like odor and taste. By refining processes well known in the art of preparing such oils for medicinal purposes, this odor and taste can be almost entirely eliminated without destroying the vitamin content thereof so as to render the oil palatable and free from unpleasant flavor. However, after such refining operations the oil rapidly reverts to its original flavor, and this takes place long prior to rancidity of the oil which rancidity is due to oxidation. This reversion occurs not only in the oils sold in their refined form as vitamin containing preparations, but also in the various extracts and concentrates prepared therefrom. Rancidity due to oxidation is not, in general, a problem in the merchandising and administering of such medicinal preparations, as they are protected from oxidation during storage and shipment such that rancidity does not ordinarily occur before use. However, the unpleasant odor and taste due to reversion is usually found in the medicinal preparations referred to at the time of administering the same. The reversion referred to is believed to be due to the presence of fatty acid radicals having three double bonds (corresponding to linolenic acid) as well as fatty acid radicals having four or more double bonds (clupanodonic acids), but applicant does not wish to be bound by any precise theory of the cause of reversion.

Various means have been employed in an attempt to overcome the disadvantageous results of such reversion, for example, attempts have been made to mask the unpleasant flavor by flavoring materials, and also concentrates or extracts have been enclosed in capsules to prevent tasting of the preparations by the person to whom the preparation is administered. Although large amounts of research have been made by prior workers in the art in an effort to prevent the development of an unpleasant taste and odor in the preparations referred to, no substantial success has resulted therefrom.

In accordance with the present invention, I have discovered that certain vegetable phosphatidic material can be added in small proportions to the refined fish or fish liver oils or preparations containing the same and that such vegetable phosphatidic material will prevent the reversion above referred to. The vegetable phosphatidic materials contemplated in the present invention are innocuous in medicinal preparations. They are substantially odorless and tasteless and are not to be confused with flavoring or masking ingredients. As stated above, the fish or fish liver oils referred to are capable of having their original flavor substantially completely removed by refining operations known in the art to produce substantially odorless, palatable oils. By adding a small percentage of the vegetable phosphatidic material of the present invention, the palatable nature of the refined oils is not impaired, and the oils or products derived therefrom retain their palatability over extended periods of time.

The phosphatidic material employed in the present invention is preferably that which is recovered from expressed vegetable oils, particularly hot pressed oils of the type which contains no fatty acid radicals having a greater unsaturation than two double bonds. Thus phosphatidic material from cottonseed oil or corn oil is particularly suitable. These phosphatidic materials are themselves stable against the formation of a disagreeable odor or taste, and, in addition, have the remarkable property of stabilizing highly unsaturated oils or products derived therefrom against their normal reversion to the original flavor of the oil. This property is not present in phosphatidic material derived from highly unsaturated vegetable oils such as soya bean oil. Soya bean oil phosphatides, for example, contain three double bond fatty acid (linolenic acid) radical, and will themselves revert to the original paint-like flavor of the soya bean oil. The phosphatidic material employed in the present invention also retards rancidity of the oil preparations, as well as preventing reversion prior to rancidity. Phosphatidic material from highly unsaturated vegetable oils such as, for example, soya bean oil, may possibly somewhat retard actual rancidity, but will not prevent reversion to the characteristic flavor of the oil which occurs long before oxidation and resultant rancidity becomes apparent.

The stabilizing agents preferably employed are phosphatidic materials recovered from such oils as cottonseed or corn oil by precipitating phosphatides, along with other minor constituents from the oil by means of precipitating reagents such as water or solutions of electrolytes and separating them from the oil by difference in specific gravity. The precipitating reagents may be neutral or slightly acidic or alkaline, but preferably have a pH value of approximately 2.5 to 4, as difficulty separable emulsions with the oil are thereby largely prevented. Since crude oils of the type mentioned usually contain small amounts of water, at least a part of the phosphatidic material is ordinarily already in precipitated form and can be removed from the oil either by a settling operation or a centrifugal separation. A larger percentage of the phosphatidic material can, however, be removed from the oil by mixing therewith sufficient additional precipitating reagent, for example, 1 to 10%, to precipitate the remaining phosphatidic material and wet the oil, and then continuously centrifugally separating the precipitated material from the oil at an elevated temperature, usually between 120° and 160° F. The elevated temperatures soften or at least partly melt the precipitated phosphatidic material, so that it is more easily separated from the oil by centrifugal separation, but care must be exercised to avoid too high temperatures or too long a treatment at the elevated temperatures, as otherwise a substantial portion of the precipitated material may redissolve in the oil.

A relatively concentrated boric acid solution, for example, a 10% solution, which has a pH of approximately 3, is the preferred precipitating reagent, as it also constitutes an effective preserving agent for preserving the crude phosphatidic material against putrefaction and fermentation, which normally occurs soon after separation. By employing this precipitating reagent, the phosphatidic material is recovered in thorough admixture with a preserving agent, and it has been found that the phosphatidic material remains stable even after the preserving agent has been neutralized or removed therefrom, for example, by adding a weak alkali or by washing with water. It is, therefore, preferred to substantially completely remove the boric acid from the phosphatidic material prior to incorporating the same into the preparations of the present invention, as the preserving action persists even if the phosphatidic material is not further purified. However, purified phosphatidic material originally precipitated from vegetable oils by precipitating agents other than boric acid and promptly thereafter relatively highly refined or purified is sufficiently stable against fermentation or putrefaction.

The crude phosphatidic material recovered from certain vegetable oils, for example, corn oil, can be employed directly in the present invention without further purification, especially if added to water and oil emulsions. However, it is desirable to remove the water or other precipitating reagent in order to put the phosphatidic material in oil soluble form if it is to be added to an oil. Phosphatidic material from certain other oils, such as cottonseed oil, must usually be at least partially purified. For example, cottonseed oil phosphatidic material, in its crude state, usually contains gossypol, which is a toxic material. This gossypol may be removed by purification steps hereinafter described. It is preferred, however, at least partly, to purify and refine even such high grade phosphatidic material as the crude corn oil phosphatides prior to employment of the present process and product. They may be purified, for example, by washing with water or salt solutions such as solutions of sodium chloride. The washing water or solution is preferably rendered slightly acidic, preferably by adding a small amount of acid such as hydrochloric acid to provide a pH of approximately 2.5 to 4 to avoid troublesome emulsions. Alternatively, the phosphatidic material may be purified by washing with acetone or hot alcohol, in both of which the desired phosphatidic material is insoluble but which dissolve certain of the impurities. Also, the desired phosphatidic material may be dissolved in petroleum solvents, such as benzol, in which certain of the impurities in the precipitated materials are insoluble, to separate the insoluble impurities. One or more of the above steps may be employed in any desired order, depending upon the amount of purification desired. Since the phosphatidic material is predominantly acetone insoluble but soluble in petroleum solvents such as benzol, it is believed to be predominantly of the cephalin type. The acetone insoluble portion thereof apparently includes the stabilizing ingredient, as the addition of this fraction to the products of the present invention renders the same stable against reversion. The purified and dried acetone insoluble cottonseed oil phosphatidic material is a yellow powder, whereas the purified acetone insoluble fractions of corn oil phosphatidic material is a grayish white waxy or pasty mass.

The crude, partially purified or substantially completely purified phosphatidic materials are not oil soluble as long as they contain substantial amounts of water, but may be directly added to and easily admixed with emulsions containing water such as codliver oil emulsions or emulsions of similar oils. These phosphatidic materials may be rendered oil soluble by drying them, preferably in a vacuum, at low temperatures, for example, room temperatures. In the dried form they are, however, somewhat difficult to disperse in an oil medium. It is, therefore, desirable to dry the same in admixture with a carrier or viscosity reducing agent which is miscible with the oil or oil product to which the phosphatidic material is to be added. This can be done by adding a refined glyceride or mineral oil to the product prior to drying. Since the phosphatidic material is added in extremely small amounts, such a carrier will not constitute a material adulterant in the products of the present invention. If it is desired to eliminate even this amount of adulteration, a highly refined oil, of the type to which the phosphatidic material is to be added to form the product of the present invention, may be employed as the carrier. Also, the phosphatidic material in suspension in water or acetone or dissolved in a petroleum solvent may be added directly to the oil or product of the present invention and the water, solvent or acetone removed therefrom by low temperature treatment under vacuum to leave the phosphatidic material dissolved in the oil product.

The proportion of phosphatidic material necessary to stabilize against reversion is extremely small, for example, .03% to 1% of the purified phosphatidic material is usually sufficient to stabilize a refined and deodorized cod-liver oil or similar oil or product derived therefrom against reversion, although in some cases somewhat more phosphatidic material may be necessary or desirable. An excess of phosphatidic material will in no way damage or change the properties of the product. Somewhat more of the crude material, if employed, may be necessary, but, in general, the phosphatidic material added will never be greater than 2 or 3%.

The phosphatidic materials employed in the present invention are distinguished from animal phosphatides or lecithin, in that the vegetable phosphatides of the present invention are largely acetone insoluble and soluble in petroleum solvents, whereas animal lecithin is soluble in acetone and insoluble in petroleum solvents. They are distinguished from such vegetable phosphatides as soya bean oil phosphatides by the fact that their fatty acid radicals are of no higher unsaturation than two double bonds. They contain only very small amounts of free or bound sugar, either in their crude or purified form as compared to soya bean phosphatides extracted directly from the beans by solvent extraction. For example, a cottonseed oil phosphatide in accordance with the present invention contained but 2.9% of reducing sugar and 2.6% of bound sugar. Their iodine number is lower as compared to vegetable phosphatides from highly unsaturated vegetable oils, for example, the acetone insoluble portion of cottonseed oil phosphatidic material is in the neighborhood of 60 and that of a similar portion of corn oil phosphatidic material is as low as 40, whereas the iodine number of a similar portion of soya bean phosphatidic material is in the neighborhood of 90.

From applicant's extensive research, it is believed that the vegetable phosphatides of the cephalin type and containing fatty acid radicals of no greater unsaturation than two double bonds are the actual stabilizing factor against reversion in the phosphatidic material employed in the present invention. It is further believed that the presence of fatty acid radicals having more than two double bonds in the phosphatidic material from highly unsaturated oils such as soya bean oil render these phosphatides ineffective. However, the phosphatidic materials recovered from vegetable oils are mixtures of complex organic compounds, and it is entirely possible that the less unsaturated phosphatidic materials recovered from such oils as corn oil and cottonseed oil contain small amounts of other substances, which are not separated from the phosphatidic material by the purification treatments above given, which are absent from such highly unsaturated oils as soya bean oil and which constitute the actual stabilizing factor. Applicant, therefore, does not wish to be bound by any precise theory of what constitutes the stabilizing factor.

While I have disclosed the preferred embodiments of my invention, it is understood that the details thereof may be varied within the scope of the following claims.

I claim:

1. A substantially tasteless and odorless medicinal preparation, which comprises, a product prepared or derived from fish oil in admixture with a small proportion of a vegetable phosphatidic material free from fatty acid radicals of greater unsaturation than two double bonds, said product being stable against reversion to the original flavor of said oil before substantial rancidity occurs.

2. A product containing substantially tasteless and odorless fish, which product will normally revert to the original flavor of said oil, and a small proportion of a vegetable phosphatidic material free from fatty acid radicals of greater unsaturation than linoleic acid, said product being stable against reversion to the original flavor of said oil before substantial rancidity thereof occurs.

3. A product containing substantially odorless and tasteless fish oil, which product will normally revert to the original flavor of said oil, and a small proportion of a phosphatidic material recovered from cottonseed oil, said product being stable against reversion to the original flavor of said fish oil.

4. A product containing substantially odorless and tasteless fish oil, which product will normally revert to the original flavor of said oil, and a small proportion of a phosphatidic material recovered from corn oil, said product being stable against reversion to the original flavor of said fish oil.

5. A substantially odorless and tasteless medicinal preparation, which comprises, fish liver oil in admixture with vegetable phosphatidic material free of fatty acid radicals having an unsaturation greater than two double bonds.

6. A substantially odorless and tasteless medicinal preparation, which comprises, codliver oil in admixture with a small proportion of phosphatidic material recovered from cottonseed oil, said product being stable against reversion to the original flavor of said codliver oil before substantial rancidity thereof occurs.

7. A substantially odorless and tasteless medicinal preparation, which comprises, codliver oil in admixture with a small proportion of phosphatidic material recovered from corn oil, said product being stable against reversion to the original flavor of said codliver oil before substantial rancidity thereof occurs.

8. The process of stabilizing products containing substantially odorless and tasteless fish oil against reversion to the original flavor of said oil before substantial oxidation thereof takes place, which comprises, incorporating in said products a small proportion of a vegetable phosphatidic material which is free of fatty acid radicals having more than two double bonds.

9. The process of stabilizing products containing substantially odorless and tasteless fish oil against reversion to the original flavor of said oil before substantial oxidation thereof takes place, which comprises, incorporating in said products a small proportion of a phosphatidic material recovered from corn oil.

10. The process of stabilizing products containing substantially odorless and tasteless fish oil against reversion to the original flavor of said oil before substantial oxidation thereof takes place, which comprises, incorporating in said products a small proportion of a phosphatidic material recovered from cottonseed oil.

BENJAMIN H. THURMAN.

CERTIFICATE OF CORRECTION.

Patent No. 2,201,062.                            May 14, 1940.

BENJAMIN H. THURMAN.

It is hereby certified that error appears in the printed specification of the above numbered patent requiring correction as follows: Page 3, second column, line 10, claim 2, after "fish" insert the word --oil--; and that the said Letters Patent should be read with this correction therein that the same may conform to the record of the case in the Patent Office.

Signed and sealed this 25th day of June, A. D. 1940.

(Seal)                                                      Henry Van Arsdale,
Acting Commissioner of Patents.